United States Patent [19]

D'Orazio et al.

[11] Patent Number: 4,927,643

[45] Date of Patent: May 22, 1990

[54] SOLUBLE FISH-ATTRACTANT COATING, COATED LURE, AND COATING COMPOSITION AND METHOD

[76] Inventors: Vincent T. D'Orazio, 5802 Tahoe Dr., Racine, Wis. 53406; Robert B. O'Brien, 3515 Indiana St., Racine, Wis. 53405

[21] Appl. No.: 275,418

[22] Filed: Nov. 23, 1988

[51] Int. Cl.$^5$ .............................................. A01K 85/00
[52] U.S. Cl. ........................................ 426/1; 43/42; 43/42.06; 427/213.3; 427/213.32
[58] Field of Search .................... 426/1; 422/901; 427/213.3, 213.32, 213.33; 43/42.06, 42; 424/84; 525/329.9

[56] References Cited

U.S. PATENT DOCUMENTS

| | | | |
|---|---|---|---|
| 3,410,689 | 11/1968 | Nathan | 99/3 |
| 3,684,519 | 8/1972 | Combs | 99/3 |
| 3,822,211 | 7/1974 | Morton | 252/132 |
| 3,875,302 | 4/1975 | Inoue | 426/1 |
| 3,876,803 | 4/1975 | Stephan et al. | 421/1 |
| 3,879,325 | 4/1975 | Forsberg | 525/160 |
| 3,953,934 | 5/1976 | Visser | 43/42.06 |
| 4,015,612 | 4/1977 | Pavlik et al. | 424/47 |
| 4,245,420 | 1/1981 | Carr | 43/42.06 |
| 4,251,547 | 2/1981 | Liggett | 426/1 |
| 4,286,020 | 8/1981 | Himel et al. | 428/407 |
| 4,353,962 | 10/1982 | Himel et al. | 428/407 |
| 4,413,014 | 11/1983 | Melancon | 426/1 |
| 4,486,460 | 12/1984 | Kienast et al. | 427/4 |
| 4,530,179 | 7/1985 | Larew | 43/42.06 |
| 4,589,223 | 5/1986 | Hastings | 43/42.24 |
| 4,704,286 | 11/1987 | Rittschof et al. | 426/1 |
| 4,731,247 | 3/1988 | Wolford et al. | 426/1 |
| 4,744,167 | 5/1988 | Steele | 43/42.06 |

FOREIGN PATENT DOCUMENTS

| | | | |
|---|---|---|---|
| 0137748 | 4/1985 | European Pat. Off. | 426/1 |
| 53-033884 | 3/1978 | Japan | 426/1 |
| 53-054593 | 5/1978 | Japan | 426/1 |
| 53-143595 | 12/1978 | Japan | 426/1 |
| 58-098045 | 6/1983 | Japan | 426/1 |
| 8707476 | 12/1987 | PCT Int'l Appl. | 43/42.06 |
| 1465276 | 2/1977 | United Kingdom | 43/42.06 |

OTHER PUBLICATIONS

Chemical Abstracts, vol. 103, 213811x (1985), Japanese Patent Doc. 60 94,047.

Chemical Abstracts, vol. 103, 159440k (1985), Japanese Patent Doc. 60 16,203.

Chemical Abstracts, vol. 101, 172643g (1984), Japanese Patent Doc. 59 98,637.

Chemical Abstracts, vol. 101, 71402x (1984), German Patent Doc. 3,333,249.

*Primary Examiner*—Donald E. Czaja
*Assistant Examiner*—D. Workman
*Attorney, Agent, or Firm*—Peter N. Jansson, Ltd.

[57] ABSTRACT

A water-soluble polymeric fishing lure coating having a odoriferous fish-attractant material dispersed therein. A composition for application onto fishing lures to provide olfactory stimulation of fish includes a volatile solvent, a polymeric material dissolved in the solvent and capable of forming a water-soluble coating, and an fish-attractant material dispersed in the solution. A method for imparting an olfactory stimulus to a fishing lure includes applying such composition onto the lure, preferably by spraying, dipping or brushing, and then exposing the lure to air for volatilization of the solvent.

14 Claims, No Drawings

SOLUBLE FISH-ATTRACTANT COATING, COATED LURE, AND COATING COMPOSITION AND METHOD

FIELD OF THE INVENTION

This invention is related generally to fishing lures and, more particularly, to non-visual sensory means for attracting fish to artificial lures in sport fishing.

BACKGROUND OF THE INVENTION

Since time immemorial human beings have engaged in fishing. Fishermen have always used every device at their disposal for locating and securing fish, and have been inclined to develop new devices and methods to achieve greater success. In recent centuries, sport fishing has risen dramatically. And, although some sport fishermen are content to lie about their fishing exploits, the increase in sport fishing has given rise to a great many new ways and means for greater success in finding and hooking fish.

While the principal means has been use of lures attractive to fish visually, efforts have also been applied in development of non-visual sensory means, that is, means for appealing to the olfactory nerves of fish. The latter means are referred to herein as "olfactory stimulants," "odoriferous fish-attractive materials," or "actives." Many olfactory stimulant compositions and devices have been developed over the years, including those disclosed in the following patents and publications:

U.S. Pat. No. 4,245,420,
U.S. Pat. No. 4,486,460,
U.S. Pat. No. 4,413,014,
U.S. Pat. No. 4,589,223,
U.S. Pat. No. 4,251,547,
U.S. Pat. No. 3,953,934,
U.S. Pat. No. 3,876,803,
U.S. Pat. No. 3,875,302,
U.S. Pat. No. 3,684,519,
U.S. Pat. No. 3,410,689,
  Chemical Abstracts, vol. 103, 213811x (1985),
    Summary of Japanese Patent Doc. No. 60 94,047.
  Chemical Abstracts, vol. 103, 159440k (1985),
    Summary of Japanese Patent Doc. No. 60 16,203.
  Chemical Abstracts, vol. 101, 172643g (1984),
    Summary of Japanese Patent Doc. No. 59 98,637.
  Chemical Abstracts, vol. 101, 71402x (1984),
    Summary of German Patent Doc. No. 3,333,249.

In some prior art disclosures, odoriferous actives have been included in polymers, gels, or porous materials which form or are part of fishing lures. In some cases coatings are used. In all such devices, the actives dissipate into the water with or from such materials for the purpose of attracting fish.

Various odor-bearing baits, lures and compositions for attracting fish by olfactory stimulants have a number of drawbacks and problems.

Some of these problems are related to the nature of the actives (odoriferous materials), the nature of the materials including such actives, or the manner of release of the actives into the water. Some of the compositions are oils such that, when applied to a lure and put into the water, the oil quickly floats off the lure to limit the duration of olfactory attractiveness of the lure.

Some other lures, devices and materials with releasable actives are wax-based and do not allow easy migration of the active to the interface of the water with the lure. Some odoriferous fish-attractant materials are solids which cannot be applied readily onto a lure. Such solid odoriferous materials are typically cast or sprinkled on the water in the area of the fishing lines, in a method known as chumming.

In certain devices of the prior art having polymers holding an odoriferous fish-attractant material, release of such material into the water is too slow, requiring a migration through the polymer matrix (or leaching out). In others, release is too fast.

In certain prior art disclosures having coatings, the coating materials are not readily applied and reapplied. Further, the dissipation of actives in such cases is often unpredictable and not readily controllable. And such coatings often can interfere with the visual qualities of a lure, thereby detracting from the attraction of the lure in one way while adding to it in another way.

There is a clear need for improved ways and means of readily and conveniently applying odoriferous actives or active-bearing compositions onto artificial lures. A quick method and means for scenting, descenting and rescenting artificial lures is needed, involving easy application and removal. And, there is a need for a treatment which will act in harmony with the lure and the water to yield a constant and controlled release of the active ingredients, and, furthermore, do so without interfering with visual qualities of the lure.

Such treatment should not include any substance which could attack the material from which the artificial lure is made. Such treatment should effectively and quickly release the odoriferous active while allowing continued release at a reasonably steady release rate for a reasonable period of time. And such treatment should not become permanently attached to the lures, fishing lines, and associated tackle.

OBJECTS OF THE INVENTION

It is an object of this invention to provide improved ways and means for olfactory stimulation of fish overcoming some of the problems and shortcomings of odoriferous fish-attractant devices, materials and compositions of the prior art.

Another object of this invention is to provide improved ways and means of imparting an odoriferous characteristic to a fishing lure.

Another object of this invention is to provide improved ways and means for applying odoriferous actives and active-bearing compositions onto artificial lures.

Another object of this invention is to provide a quick and easy method and means for applying, removing and reapplying odoriferous materials to and from artificial lures.

Another object of this invention is to provide an improved odoriferous fishing lure with improved odoriferous characteristics.

Another object of this invention is to provide an improved odoriferous treatment for fishing lures which will act in harmony with the lure and the water to yield a constant and controlled release of the active ingredients.

Another object of this invention is to provide an improved odoriferous treatment for fishing lures which can be effectively and quickly released into the water at a steady release rate for a reasonable period of time.

Another object of this invention is to provide an improved odoriferous treatment for fishing lures which will not become permanently attached to the lures, fishing lines, or associated tackle.

Another object of this invention is to provide an improved odoriferous coating for lures which does not interfere with the visual attractiveness of the lure to fish.

Another object of this invention is to provide an improved odoriferous material for fishing lures allowing ready variations in fishing tactics.

Another object of this invention is to provide an improved odoriferous coating material for fishing lures.

These and other important objects will be apparent from the descriptions of this invention which follow.

SUMMARY OF THE INVENTION

This invention is a water-soluble polymeric coating for fishing lures providing olfactory stimulation of fish, a fishing lure having such coating, a coating composition for fishing lures, and a method for imparting an olfactory stimulus to a fishing lure. The invention overcomes certain problems and shortcomings of the prior art, including those mentioned above.

More specifically, the coating of this invention has a water-soluble polymeric material with an odoriferous fish-attractant material dispersed in it. The coating dissipates when a coated lure is in the water, steadily releasing the fish-attractant material into the water at the site of the lure to attract fish to it.

The liquid composition, which is applied and hardened to form such coating, includes a volatile solvent, a polymeric material dissolved in the solvent and capable of forming a water-soluble coating, and a fish-attractant material dispersed in the solution. The method involves application of such liquid composition onto a fishing lure structure and then exposing the liquid-covered lure to air for volatilization of the solvent to solidify the liquid composition on the surface of the lure into a solid, water-soluble coating.

The liquid composition preferably includes a neutralizer in an amount sufficient to render the polymeric material water-soluble to a predetermined extent. If the polymeric material is acidic, as preferred, the neutralizer will be a base. On the other hand, if the polymeric material is alkaline, the neutralizer will be acidic.

The volatile solvent used in the liquid composition is preferably a polar solvent. Preferred volatile solvents are alcohols and ketones. A particularly preferred solvent is ethanol.

The odoriferous fish-attractant materials used in the liquid composition may vary greatly, both in constituents and in amounts thereof. It is highly preferred to utilize a mixture of odoriferous fish-attractant materials. Such olfactory stimulants may be: fish oils; extracts of various fishes and fish by-products; extracts and residues of earthworms, grubs and insects; anise oil; certain essential oils; certain amino acids, such as L-proline and L-leucine; fish egg extract; fish meal homogenate; morpholine; and various mixtures of these materials. Particularly preferred materials which may be blended together for use are anise oil, fish oil and amino acids.

The fish-attractant materials may be liquids, as in the case of the aforementioned oils, or they may include very small solid particles, preferably of minuscule size. The size of such particles can be minimized by blending, or other processing steps. When in liquid or solid form, the fish-attractant materials may be thoroughly dispersed in the liquid composition and, ultimately, substantially homogeneously dispersed in the water-soluble coating formed from such liquid composition.

The amounts and proportions of the constituents of the liquid composition of this invention can vary greatly.

The polymeric material is preferably present in an amount of about 1% to about 40% by weight of said composition, and, most preferably about 2% to about 10%. With less than about 1% polymeric material, it is difficult to apply a coating sufficient for the purposes of this invention. With more than about 40%, viscosity makes solution difficult and film-forming properties are unsuitable. The amount of polymeric materials is preferably chosen to be what is required to effectively hold the fish-attractant material used.

The neutralizer is preferably present in an amount sufficient to neutralize about 1% to about 40% of the polymer, and, most preferably, about 2% to about 10%. Preferred amounts will depend on many factors, including the nature and amount of the polymer, the temperature of the water in which the lure is used, and the method of fishing. The weight percent of neutralizer in the liquid formulations of this invention will also vary depending on molecular structure and reactivity. Depending on the neutralizer and polymer used and the desired extent of neutralization, the amount of neutralizer can preferably range from about 0.001% to about 2% by weight of the composition.

While there is an optimum degree of neutralization for film formation, that is, to produce maximum film hardness, increases in the extent of neutralization beyond the optimum point will increase the solubility of the film. Such greater neutralization means greater water solubility, which in turn means that the final coating will dissolve faster, giving the coating a shorter useful life in the water. Shorter useful life in water in some cases is desirable.

The precise solubility characteristics of the fish-attractant coating of this invention can readily be predetermined by accurately setting the extent of neutralization in the formulation process for the liquid composition. Coatings requiring on the order of one day of exposure during fishing (e.g., about four hours in the water) may readily be made. Likewise, coatings having an intentionally shorter life (e.g., two hours or less) may readily be made.

In some cases, it is considered desirable to make the useful life of a coating sufficiently short such that the lure may be frequently recoated. Some fishermen may even wish to change coatings from time to time as a part of their tactical moves in fishing for certain species of fish.

The coatings and coated fishing lures of this invention exhibit a greater effectiveness in steady release of fish-attractant materials than is shown in the prior art. Because of such effective and steady release, in many cases a significantly lower amount of fish-attractant material is needed to effectively attract fish. Preferred embodiments of the invention use very small amounts of actives, yet yield good results during fishing.

The fist-attractant material is preferably present in an amount of about 0.01% to about 5% by weight of the liquid composition. More preferably, the fish-attractant material is present in an amount of about 0.1% to about 2.0% by weight of the liquid composition. About 1% is highly preferred.

With less than about 0.01% of fish-attractant material in the liquid formulation, it is believed there may be insufficient olfactory stimulation to fish. It should be noted, however, that the extent of stimulation can be expected to vary greatly depending on, among other things, the nature of the fish-attractant material used. More than about 5% of fish-attractant material in the liquid formulation is believed unnecessary and possibly problematic in that it becomes increasingly harder to be held in dispersion by the polymer portion of the coating.

It is believed that fish have very sensitive olfactory systems. For example, some experts believe that the olfactory system of a dog may be about one thousand times more sensitive than that of a human being, and that the olfactory systems of fish may be on the order of one thousand times more sensitive than that of a dog. For this reason, it is believed that too much fish-attractant material might in some cases repel fish, or perhaps be unnecessary.

The method of this invention for imparting an olfactory stimulus to a fishing lure includes applying onto the fishing lure the liquid composition just described and then exposing the liquid-coated fishing lure to air to allow volatilization of the solvent. This method forms a solid coating on the lure which in water can dissipate over time and release the fish-attractant material.

The liquid composition is preferably applied by spraying, dipping or brushing. If spraying is used, the application step may be carried out using an aerosol preparation of such liquid composition.

The solidifying step can readily be carried out at room temperature in fifteen minutes or less. If the fishing lure, covered with such liquid composition, is in warmer air or sunlight, solidification into a coating may take less time. Of course, the speed of solidification depends on the volatile solvent used, the amount of polymer, the nature of the polymer, and other factors.

As already noted, fishing lures having coatings in accordance with this invention provide a steady discharge of fish-attractant material into the water surrounding the lure. This gives such lures extra attractiveness to fish. In preferred embodiments of this invention, the coating is transparent. This has the advantage of preserving the visual attractiveness of the lure.

The fishing lures of this invention are useful in a great variety of different fishing methods. Among these are trolling, jigging, still fishing, and spoon-casting, to name only a few.

The fishing lures of this invention are preferably artificial lures. The structures of such lures on which the water-soluble coating is deposited are insoluble to water. The lures may be made of plastics, metal, organic material, and any other sort of material. The liquid coating composition and solidified coating should be such as to not attack or degrade the underlying lure structure.

In addition to providing a fish-attractant material in a form allowing steady dissipation into the water to attract fish, the fish-attractant material can serve to hide human odors thought by some fishermen to repel fish in some cases.

As noted, the volatile solvent is preferably a polar solvent. Alcohols and ketones are preferred. Alcohols are particularly preferred as a class because they tolerate varying degrees of water-modified polymers and also allow for fast drying of the coatings onto the lures. Some will also kill germs and other unintended odor sources placed on the lures by normal handling. Preferred alcohols include ethanol, methanol, and isopropanol. Ethanol is most preferred since it is both quite volatile and free of strong odor. Among the ketones, acetone, methyl ethyl ketone, and diethyl ketone are preferred, with acetone being most preferred. Methylene chloride, glycol ethers, and dimethyl formamide are other acceptable polar solvents. Combinations of solvents can be used.

Acceptable acidic polymers include: carboxylated vinyl acetate copolymer, such as a vinyl acetate/crotonic acid copolymer sold by National Starch and Chemical Company, Bridgewater, N.J., under the trademark RESYN 28-1310; carboxylated vinyl acetate terpolymers, such as a vinyl acetate/crotonic acid/vinyl neodoconate sold as RESYN 28-2930; an octylacrylamide/acrylates/butylaminoethylmethacrylate terpolymer sold as RESYN 28-4910; and copolymers of monobutyl ester of 2-butenedioic acid/methoxyethylene, such as that sold by GAF, Wayne, N.J. under the trademark GANTREZ ES-435. Acceptable alkaline polymers include polyvinylpyrrolidone (PVP) and substituted aminoethylacryalates such as dimethylaminoethylacrylate.

Depending on the choice and amount of fish-attractant materials used and the extent of neutralization chosen, many of the formulations of the liquid composition of this invention will form coatings with a high level of clarity (transparency). For example, certain formulations made with RESYN 28-2930 terpolymer will yield transparent coatings. Other polymers will do likewise. Coatings may be sufficiently transparent that they do not noticeably interfere with the visual appearance of a fishing lure. The degree of neutralization affects the extent of clarity of the coating, that is, the degree of transparency.

Acceptable neutralizers depend on the nature of the polymeric material used. For polymers which are acidic acceptable neutralizers include ammonium hydroxide, sodium potassium hydroxide, 2-amino-2-methyl-1-propanol and 2-amino-2-methyl-13-propandiol, and morpholine. Morpholine may serve a double function; it is a preferred odoriferous fish-attractant material or component. Ammonium hydroxide may serve a similar double function. For polymers which are alkaline, acceptable neutralizers include inorganic acids such as hydrochloric and phosphoric acid and organic acids such as acetic and citric acid.

In use, the coated fishing lures and fish-attractant coatings of this invention exhibit significant, marked improvements in attracting fish an causing fish to strike.

EXAMPLES OF THE INVENTION

Three different odoriferous fish-attractant materials are used in most of the examples which follow. In one example, morpholine is used, while in the other examples one of the following two mixes are used:

| Odoriferous Mix A | |
|---|---|
| Anise oil | ⅓ of the mix by weight |
| Fish oil | ⅓ |
| Amino acids (50% L-proline and 50% L-leucine) | ⅓ |
| Odoriferous Mix B | |
| Anise oil | 30% of the mix by weight |

| | |
|---|---|
| Fish oil | 30% |
| Amino acids | 30% |
| Earthworm extract | 2.5% |
| Fish egg extract | 2.5% |
| Fish meal homogenate | 2.5% |
| Morpholine | 2.5%. |

Each of these two mixes was finely comminuted and blended, using a common high-speed blender.

In each of the examples which follow, all ingredients are added and then the mixture is blended, again using a common high-speed blender. No particular order is necessary in the blending procedures. A wide variety of blending steps and procedures are possible. Suitable methods will depend on such things as the volume of liquid composition to be made.

EXAMPLE 1

A liquid coating composition was made in accordance with this invention using the following formulation:

| | |
|---|---|
| RESYN 28-1310 | 5% by weight |
| Ammonium hydroxide | 0.02% |
| Odoriferous Mix A | 0.5% |
| Ethanol | to 100%. |

A freely flowing liquid is produced. A fishing spoon with bright colors is dipped in such liquid and allowed to air dry. Drying takes less than 10 minutes. The resulting coating is transparent, leaving the colors uncovered. The coating lasts for about 4–8 hours of fishing. Throughout the period in the water, fish-attractant materials are steadily released at the site of the lure, and serve to attract fish. The lure is ready for recoating after use.

EXAMPLE 2

A liquid coating composition was made in accordance with this invention using the formulation of Example I, modified to replace Odoriferous Mix A with Odoriferous Mix B. The results are substantially the same.

EXAMPLE 3

A liquid coating composition was made in accordance with this invention using the following formulation:

| | |
|---|---|
| RESYN 28-1310 | 1% by weight |
| Ammonium hydroxide | 0.003% |
| Odoriferous Mix B | 0.01% |
| Methanol | to 100%. |

A freely flowing liquid is produced and packaged in a spray package. A fishing lure is misted with such liquid and allowed to air dry. The drying step in sunlight takes less than 5 minutes. The resulting coating is very thin and virtually invisible. Because of its thinness, the coating lasts only a couple of hours or less, despite its hardness. Then the lure is ready for recoating.

EXAMPLE 4

A liquid coating composition was made in accordance with this invention using the following formulation:

| | |
|---|---|
| RESYN 28-1310 | 2% by weight |
| Morpholine | 0.075% |
| Acetone | to 100%. |

A freely flowing liquid composition is produced, which may be applied to a fishing lure by dipping. The morpholine serves a double function in this example, being part of the odoriferous mix as well as the neutralizer. The coating will dissipate relatively quickly.

EXAMPLE 5

A liquid coating composition was made in accordance with this invention using the following formulation:

| | |
|---|---|
| RESYN 28-2930 | 10% by weight |
| Aminomethylpropanol | 0.1% |
| Odoriferous Mix A | 0.5% |
| Ethanol | to 100%. |

A liquid composition is produced. A fishing lure is dipped in such liquid and allowed to air dry, which requires only a few minutes. This coating lasts for about 2 hours of fishing, after which the lure is ready for recoating.

EXAMPLE 6

A liquid coating composition was made in accordance with this invention using the following formulation:

| | |
|---|---|
| RESYN 28-1310 | 40% by weight |
| Sodium hydroxide | 0.5% |
| Odoriferous Mix B | 5% |
| Ethanol | to 100%. |

The liquid composition which is produced is more viscous than compositions of the earlier examples. The composition is placed in a bottle having a brush inside its cap. Such composition is brushed onto a fishing lure and allowed to air dry. The drying step takes about 15 minutes. A relatively thick coating is produced.

EXAMPLE

A liquid coating composition was made in accordance with this invention using the following formulation:

| | |
|---|---|
| GANTREZ ES-435 | 5% by weight |
| Potassium hydroxide | 0.025% |
| Odoriferous Mix B | 1% |
| Isopropanol | to 100%. |

This is an example of a liquid composition and resulting coating having another acidic polymer. A fishing lure is dipped into such composition and hardens in less than 15 minutes. The coating lasts for about 4–8 hours of fishing.

EXAMPLE 8

A liquid coating composition was made in accordance with this invention using the following formulation:

| | |
|---|---|
| Polyvinylpyrrolidone | 5% by weight |
| Hydrochloric acid | 0.2% |
| Odoriferous Mix A | 1% |
| Ethanol | to 100%. |

This is an example of a liquid composition of this invention having an alkaline polymer. A fishing lure is dipped into such composition and hardens in less than 10 minutes. The coating lasts for about 4-8 hours of fishing.

While the principles of this invention have been described in connection with specific embodiments, it should be understood clearly that these descriptions are made only by way of example and are not intended to limit the scope of the invention.

We claim:

1. A liquid composition for application onto pre-existing fishing lure structures comprising:
   a volatile solvent;
   a polymer dissolved in the solvent and capable of forming a water-soluble coating upon volatilization of the solvent, the polymer selected from the group consisting of acidic polymers and alkaline polymers;
   a neutralizer for the polymer present in an amount sufficient for partial neutralization to render the coating polymer water soluble to an extent; and
   an odoriferous fish-attractant material dispersed in the solution, said fish-attractant material being selected from the group consisting of anise oil, fish oil, amino acids, earthworm extract, fish egg extract, fish meal homogenate, and mixtures thereof, whereby the composition, when applied in liquid form onto a fishing lure structure, solidifies to a substantially continuous film coating thereon which will dissipate in water over time for steady extended release of the fish-attractant material without erosion or breakup of the pre-existing fishing lure structure.

2. The composition of claim 1 wherein the volatile solvent is a polar solvent.

3. The composition of claim 2 wherein the polar solvent is selected from the group consisting of alcohols and ketones.

4. The composition of claim 3 wherein the polar solvent comprises ethanol.

5. The composition of claim 1 wherein the odoriferous fish-attractant material comprises a mixture of anise oil, fish oil and amino acids.

6. The composition of claim 1 wherein:
   the polymeric material is present in an amount of about 1% to about 40% by weight of said composition;
   the neutralizer is present in an amount sufficient to neutralize about 1% to about 40% of the polymer; and
   the fish-attractant material is present in an amount of about 0.01% to about 5%.

7. The composition of claim 6 wherein the polymer is present in an amount of about 2% to about 10% by weight of said composition.

8. The composition of claim 7 wherein the fish-attractant material is present in an amount of about 0.1% to about 2.0% by weight of said composition.

9. A method for steady release over time of an olfactory stimulus from the site of a pre-existing fishing lure structure in water comprising:
   applying to the pre-existing fishing lure structure a liquid composition including: a volatile solvent; a polymer dissolved in the solvent and capable of forming a water-soluble coating upon volatilization of the solvent, the polymer selected from the group consisting of acidic polymers and alkaline polymers; an odoriferous fish-attractant material dispersed in the solution; and a neutralizer in an amount sufficient for partial neutralization of the polymer to render the polymer water-soluble to an extent;
   exposing the liquid-coated fishing lure structure to air to allow volatilization of the solvent and formation of a solid substantially continuous film coating on the lure; and
   gradually and steadily over an extended time dissipating said film coating from said fishing lure structure, while fishing with said fishing lure structure in water, without erosion or breakup of said pre-existing structure,
   thereby steadily releasing the fish-attractant material at the site of the lure structure in a lure-focused manner.

10. The method of claim 9 wherein the applying step is chosen from group of applying steps consisting of spraying, dipping, and brushing.

11. The method of claim 10 wherein:
   the applying step is carried out by spraying; and
   the composition is pressurized for aerosol application.

12. The method of claim 9 wherein the fish-attractant material is selected from the group consisting of anise oil, fish oil, amino acids, earthworm extract, fish egg extract, fish meal homogenate, morpholine, and mixtures thereof.

13. A coated fishing lure comprising:
   pre-existing water-insoluble lure structure; and
   a solid substantially continuous water-soluble polymeric film coating affixed to the lure structure and having a odoriferous fish-attractant material homogeneously dispersed therein, said polymeric film coating being of a polymer selected from the group consisting of acidic polymers and alkaline polymers which is partially neutralized to render it water-soluble to an extent, and said fish-attractant material being selected from the group consisting of anise oil, fish oil, amino acids, earthworm extract, fish egg extract, fish meal homogenate, and mixtures thereof,
   whereby the fish-attractant material is steadily released into the water at the lure at a substantial rate while the coating lasts, without erosion or breakup of the pre-existing lure structure.

14. The fishing lure of claim 13 wherein the coating is substantially transparent, whereby the visual qualities of the lure structure are maintained.

* * * * *

UNITED STATES PATENT AND TRADEMARK OFFICE
CERTIFICATE OF CORRECTION

PATENT NO. : 4,927,643                         Page 1 of 4

DATED : May 22, 1990

INVENTOR(S) : Vincent T. D'Orazio and Robert B. O'Brien

It is certified that error appears in the above-identified patent and that said Letters Patent is hereby corrected as shown below:

In column 4, line 64, change "fist-attractant" to --fish-attractant--.

In column 6, line 43, change "2-amino-2-methyl-13-proprandiol" to --2-amino-2-methyl-1,3-proprandiol--.

In EXAMPLE 1, 2nd paragraph of full text, line 4, change "colors-" to --colors--.

In EXAMPLE 2, line 3, change "I" to --1--.

In claim 1, the organization of the subparagraphing is incorrect in that the last seven lines of the claim are not a part of the last subparagraph, and should instead be justified with the left margin. The correct organization of the claim is as follows:

--1. A liquid composition for application onto pre-existing fishing lure structures comprising:

a volatile solvent;

a polymer dissolved in the solvent and capable of forming a water-soluble coating upon volatilization of the solvent, the polymer selected from the group consisting of acidic polymers and alkaline polymers;

a neutralizer for the polymer present in an amount sufficient for partial neutralization to render the coating polymer water soluble to an extent; and an odoriferous fish-attractant material dispersed in the solution, said fish-attractant material being selected from the group consisting of anise oil, fish oil, amino acids, earthworm extract, fish egg extract, fish meal homogenate, and mixtures thereof,

UNITED STATES PATENT AND TRADEMARK OFFICE
CERTIFICATE OF CORRECTION

PATENT NO. : 4,927,643

DATED : May 22, 1990

INVENTOR(S) : Vincent T. D'Orazio and Robert B. O'Brien

It is certified that error appears in the above-identified patent and that said Letters Patent is hereby corrected as shown below:

whereby the composition, when applied in liquid form onto a fishing lure structure, solidifies to a substantially continuous film coating thereon which will dissipate in water over time for steady extended release of the fish-attractant material without erosion or breakup of the pre-existing fishing lure structure.--

In claim 9, the organization of the subparagraphing is incorrect in that the last three lines of the claim are not a part of the last subparagraph, and should instead be justified with the left margin. The correct organization of the claim is as follows:

--9. A method for steady release over time of an olfactory stimulus from the site of a pre-existing fishing lure structure in water comprising:

applying to the pre-existing fishing lure structure a liquid composition including: a volatile solvent; a polymer dissolved in the solvent and capable of forming a water-soluble coating upon volatilization of the solvent, the polymer selected from the group consisting of acidic polymers and alkaline polymers; an odoriferous fish-attractant material dispersed in the solution; and a neutralizer in an amount sufficient for partial neutralization of the polymer to render the polymer water-soluble to an extent;

exposing the liquid-coated fishing lure structure to air to allow volatilization of the solvent and formation of a solid substantially continuous film coating on the lure; and gradually and steadily over an extended time dissipating said film coating from said fishing lure structure, while fishing with said fishing lure structure in water, without erosion or breakup of said pre-existing structure,

UNITED STATES PATENT AND TRADEMARK OFFICE
CERTIFICATE OF CORRECTION

PATENT NO. : 4,927,643

DATED : May 22, 1990

INVENTOR(S) : Vincent T. D'Orazio and Robert B. O'Brien

It is certified that error appears in the above-identified patent and that said Letters Patent is hereby corrected as shown below:

thereby steadily releasing the fish-attractant material at the site of the lure structure in a lure-focused manner.--

In claim 13, the organization of the subparagraphing is incorrect in that the last four lines of the claim are not a part of the last subparagraph, and should instead be justified with the left margin. The correct organization of the claim is as follows:

--13. A coated fishing lure comprising:

a pre-existing water-insoluble lure structure; and a solid substantially continuous water-soluble polymeric film coating affixed to the lure structure and having a odoriferous fish-attractant material homogeneously dispersed therein, said polymeric film coating being of a polymer selected from the group consisting of acidic polymers and alkaline polymers which is partially neutralized to render it water-soluble to an extent, and said fish-attractant material being selected from the group consisting of anise oil, fish oil, amino acids, earthworm extract, fish egg extract, fish meal homogenate, and mixtures thereof,

UNITED STATES PATENT AND TRADEMARK OFFICE
CERTIFICATE OF CORRECTION

PATENT NO. : 4,927,643   Page 4 of 4

DATED : May 22, 1990

INVENTOR(S) : Vincent T. D'Orazio and Robert B. O'Brien

It is certified that error appears in the above-identified patent and that said Letters Patent is hereby corrected as shown below:

whereby the fish-attractant material is steadily released into the water at the lure at a substantial rate while the coating lasts, without erosion or breakup of the pre-existing lure structure.--

Signed and Sealed this

Thirtieth Day of July, 1991

Attest:

*Attesting Officer*

HARRY F. MANBECK, JR.

*Commissioner of Patents and Trademarks*